J. E. KEPPEL.
TAIL LIGHT SIGNAL.
APPLICATION FILED SEPT. 30, 1916. RENEWED APR. 21, 1920.
1,352,279. Patented Sept. 7, 1920.
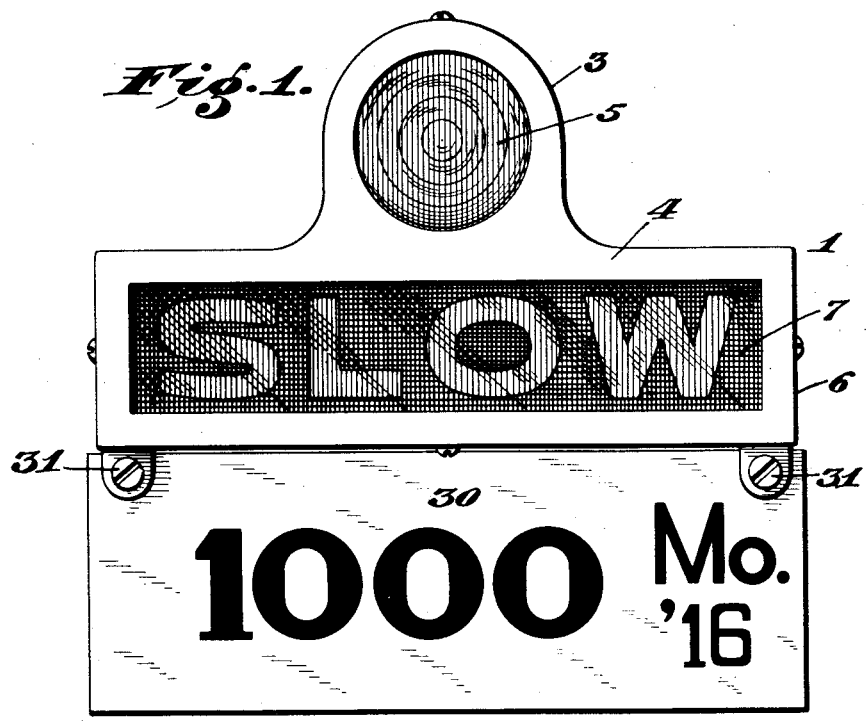
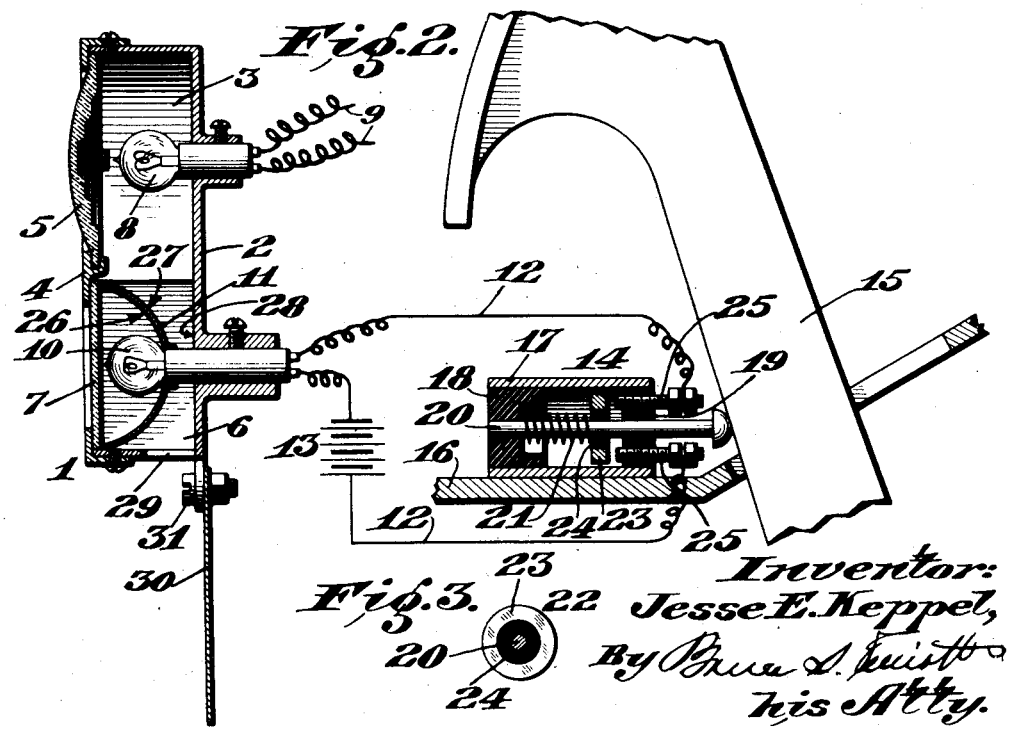

UNITED STATES PATENT OFFICE.

JESSE E. KEPPEL, OF ST. LOUIS, MISSOURI, ASSIGNOR TO INTERNATIONAL AERIAL NAVIGATION COMPANY, OF ST. LOUIS, MISSOURI, A CORPORATION OF MISSOURI.

TAIL-LIGHT SIGNAL.

1,352,279. Specification of Letters Patent. Patented Sept. 7, 1920.

Application filed September 30, 1916, Serial No. 122,959. Renewed April 21, 1920. Serial No. 375,650.

*To all whom it may concern:*

Be it known that I, JESSE E. KEPPEL, a citizen of the United States, residing in the city of St. Louis and State of Missouri, have invented new and useful Improvements in Tail-Light Signals, of which the following is a specification.

This invention relates to signal apparatus and signals, and while the invention is capable of application to different uses, in the following specification I have described the invention as applied to an automobile.

In operating automobiles accidents sometimes occur when a car ahead suddenly slows down, owing to the fact that the driver of a car running behind has insufficient time to slow down his car after he knows that the forward car is slowing down. It is customary now for the operator of the car ahead to extend his hand at the side of the car so that the signal will enable the operator of the car behind to be on his guard. Extending the hand in this way is used among automobilists to indicate either that the car is going to slow down or turn to the right or left, and hence even when the extended hand is used as a signal it is at best an indefinite signal, and it is not effective or satisfactory as a signal to prevent accidents.

The general object of the present invention is to produce a signal apparatus, particularly applicable for automobiles and including a very compact and simple signal device which will operate as an ordinary tail light, and also afford means for lighting the license number plate of the car, but also having special signaling means enabling a special signal to be given at will, so that the operator of a car behind will know without delay if a car running ahead is going to slow down.

Further objects of the invention will appear hereinafter.

In the drawing which illustrates the preferred embodiment of my invention,

Figure 1 is a rear elevation of the signal device,

Fig. 2 is a vertical section through the signal device and through an automatic switch which controls the special signal, and which itself is controlled at the will of the operator, for example, through the medium of the brake lever of the automobile, and Fig. 3 is a cross section through the stem of the plunger forming a part of the automatic switch, and particularly illustrating a feature of the construction of this plunger.

In practice the signal device 1 is supported in any suitable manner at the rear of the automobile at the place usually occupied by the tail light and license plate. The signal device 1 comprises a case 2, the upper portion of which is of semicircular form so as to form an elevated pocket 3, and at this point the rear wall 4 of the case is provided with a circular opening in which there is mounted a translucent member or bull's-eye 5 which is constantly illuminated so as to give a continuous danger signal. The lower portion 6 of this case 2 is elongated horizontally and the case is preferably symmetrical with respect to a vertical axis, so that the bull's-eye 5 is located over the middle point of the lower portion of the case. In the rear wall 4 and behind the elongated lower portion of the case I provide a second translucent member 7, the purpose of which is to enable a special signal to be given when desired. This translucent member 7 is preferably a plate of glass which is substantially opaque, unless illuminated from the interior of the case, that is to say in daylight no signal word will appear on the glass. But when illuminated from the interior a warning word, such as the word "slow" appears in the glass. In the interior of the case I provide lighting means for illuminating these two signal members, and I provide other parts coöperating with the lighting means in such a way that the signal member 5 is continuously active, whereas the signal member 7 is normally inactive, but becomes active at any time at will of the operator of the car. For this purpose the lighting means preferably consists of an electric light 8 located in the pocket 3 of the case and continuously lighted through the medium of conductors 9 connected with an electric battery or other suitable source of electro-motive force, and the lighting means also includes an electric light 10 in the lower portion of the case. This light is preferably placed before a shield or hood 11 which may be formed of a curved plate. This hood is arranged so that it excludes all rays of light from the lamp 8, preventing them from passing through the translucent plate 7. In other words this lamp 10 is located between the hood 11 and the translucent plate 7.

This lamp is normally dark, but may be lighted at will. For this purpose this lamp is in a circuit 12 including the battery 13 or other source of electro-motive force and also including an automatic switch 14. This switch may be arranged in any suitable manner so that it is controlled automatically by the operator, for example, it may be mounted at any point adjacent the brake lever 15 of the car or automobile. In the present instance simply for illustration, I have represented the switch as attached at a convenient point on the floor 16.

In order to insure that no short circuit will occur and in order to give the switch a very simple construction, I prefer to construct it of a small cylindrical case 17, having two insulated heads 18 and 19. These heads operate as guides for a central stem or plunger 20 which slides freely in the heads, and is always pressed in the direction of the lever 15 by a coiled spring 21 disposed within the case and which thrusts against a collar 22 fixed on the plunger. This collar comprises a contact ring 23 which is fixed on an inner collar 24 of insulating material which is fixed on the stem or plunger.

In the insulating head 19 are mounted two adjustable contact screws 25 to which attach the conductors of the circuit 12 so that these screws 25 constitute terminals for the switch. When the brake lever 15 is in the normal position indicated in Fig. 2 its rear edge engages the head of the plunger 20 and holds the contact ring 23 out of contact with the terminals 25. When the lever 15 is moved forwardly as in applying the brake, it no longer obstructs the movement of the plunger 20, and the spring 21 then moves the plunger to the right and causes the ring 23 to bridge the terminals 25 and thereby close the circuit.

In order to prevent any visibility of the signal word on the plate 7 in daylight, I prefer that the inner face 26 of the hood 11 be of a nonreflecting character, and hence I prefer to paint this inner face black. The upper end rear face 27 of this hood is, however, a reflector, having a prepared surface of a reflecting and polished material, as also is the surface 28 on the case. The upper side of this hood is exposed to the rays from the lamp 8 and reflects them against the surface 28. In this connection attention is called to the fact that the hood 11 is disposed to the rear of the forward wall of the case so as to present an opening through which the rays from the light 8 may pass downwardly by successive reflections on the surfaces 27 and 28; and in the underside of the case I form a window 29 through which these rays of light pass downwardly to illuminate the rear side of the license number plate 30, which is attached to and supported by the lower part of the case 2. With this arrangement it is evident that the elevated position of the light 8 and the location of the elongated portion 6 of the case directly over the license plate 30 gives ample opportunity for the lateral divergence of rays from the lamp 8 so that the ends of the plate 30 are well illuminated, as well as the middle portion of this plate. Furthermore, the polished and reflecting character of the surfaces 27 and 28 of the case assists in diffusing the light and tends to effect a substantially uniform distribution of light on the opaque license plate 30. The license plate may be removably supported through the medium of suitable small bolts 31.

The hood 11 extends throughout the length of the translucent member 7.

It is understood that the embodiment of the invention described herein is only one of the many embodiments my invention may take and I do not wish to be limited in the practice of my invention nor in my claims to the particular embodiment set forth.

What I claim and desire to secure by Letters Patent is:

1. In a signal apparatus, the combination of a case, a translucent signal member carried thereby, an electric light for illuminating said translucent member continuously to give a continuous signal, a second translucent member below the first named translucent member for giving a special signal and normally inactive, a hood adjacent said second translucent member disposed below said electric light and back of the forward wall of said case so as to leave a space between said hood and said forward wall, the upper and rear side of said hood being a reflector for reflecting the rays from said light down through said space, said case having a window at the under side thereof, through which said reflected rays may pass, and a sign plate carried by said case below said window and receiving the reflected rays passing through said window.

2. In a signal apparatus, the combination of a case the middle portion whereof projects upwardly to form an elevated pocket, a translucent member mounted in the rear wall of said pocket for giving a continuous signal, said case having a horizontally elongated lower portion, a second translucent member mounted in the wall of said case at said elongated lower portion and normally inactive, for giving a special signal, lighting means within said elevated pocket and in the lower portion of said case for throwing rays of light through the said translucent members, a hood adjacent said second translucent member having a reflector on its inner side and a reflecting surface on its upper and outer side, the upper and outer side of said reflector being exposed to the rays of said lighting means, for reflecting the rays downwardly, said case having a window on the under side thereof below said elongated portion, through which the reflected rays of light may pass downwardly, and a sign supported by said case below said window the face whereof is illuminated by the light coming through the window.

3. In an automobile signal, the combination of a case, the upper portion whereof projects upwardly to form an elevated pocket, a translucent member mounted in the wall of the said upper portion of said case, for giving a continuous signal, said case having a horizontally elongated lower portion, a second translucent member mounted in the wall of said case at said horizontal elongated portion and normally inactive, for giving a special signal, a light in the lower portion of said case adjacent said second translucent member, an elongated hood adjacent said light and extending longitudinally with said elongated portion, said hood being concave on the side adjacent said second translucent member and convex on its other side, the convex side of said hood being disposed at a distance from the forward wall of said case so as to leave a space between the same and said hood, an electric light disposed within said elevated pocket in a position to cast its direct rays on the convex side of said hood, the convex side of said hood and the adjacent part of said wall being polished reflectors for reflecting the rays down through said space, said case having a window in the under side thereof below said elongated portion, through which the rays of light pass downwardly, and a license plate supported by said case below said window, the face whereof is illuminated by the light diffused and reflected downwardly through said window by said reflectors.

In testimony whereof, I have hereunto set my hand.

JESSE E. KEPPEL.